United States Patent
Wood et al.

(10) Patent No.: US 9,727,873 B1
(45) Date of Patent: Aug. 8, 2017

(54) DIGITAL RETURNS

(75) Inventors: James H. Wood, Seattle, WA (US); Wesley Shawn Davis, Seattle, WA (US); Bradley M. Baron, Seattle, WA (US); Jinesh U. Vora, Issaquah, WA (US); James Marvin Freeman, II, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 882 days.

(21) Appl. No.: 13/033,378

(22) Filed: Feb. 23, 2011

(51) Int. Cl.
  G06Q 10/00 (2012.01)
  G06Q 30/00 (2012.01)
  G06Q 30/02 (2012.01)
  G06Q 30/06 (2012.01)

(52) U.S. Cl.
  CPC .......... *G06Q 30/016* (2013.01); *G06Q 30/02* (2013.01); *G06Q 30/06* (2013.01)

(58) Field of Classification Search
  None
  See application file for complete search history.

(56) References Cited

U.S. PATENT DOCUMENTS

| | | | |
|---|---|---|---|
| 6,535,592 B1* | 3/2003 | Snelgrove | 379/114.07 |
| 6,618,776 B1* | 9/2003 | Zimmermann | G06F 13/4295 375/240 |
| 7,006,435 B1* | 2/2006 | Davies et al. | 370/230 |
| 7,092,356 B2* | 8/2006 | Rabie et al. | 370/230 |
| 7,400,583 B2* | 7/2008 | Friskney et al. | 370/235 |
| 2002/0006116 A1* | 1/2002 | Burkhart | H04B 7/18584 370/316 |
| 2002/0138846 A1* | 9/2002 | Mizutani et al. | 725/93 |
| 2005/0265555 A1* | 12/2005 | Pippuri | 380/284 |
| 2007/0030815 A1* | 2/2007 | Beerends et al. | 370/252 |
| 2008/0005156 A1* | 1/2008 | Edwards et al. | 707/102 |
| 2009/0144764 A1* | 6/2009 | Mehta et al. | 725/1 |

OTHER PUBLICATIONS n2nsoft.com, "Network planning for Quality of Experience", 2007, http://www.n2nsoft.com/uploads/File/QoE-wp-N2Nsoft.pdf.*
Netflix Notice dated Nov 11, 2010, 2 pgs.

* cited by examiner

*Primary Examiner* — Paul R Fisher
(74) *Attorney, Agent, or Firm* — Lee & Hayes, PLLC

(57) ABSTRACT

When a user receives digital content from a host over a network, such as streaming media, the user typically desires to receive a certain quality of the digital content with few or no interruptions. Techniques may be used to store and monitor a quality of digital content, a quality of the transmission of the digital content that is transmitted to a client device of a user, and/or the quality of rendering of the digital content by the client device. The techniques may provide restitution to the user when the quality of the digital content, transmission, and/or rendering thereof fails to comply with predetermined threshold values.

27 Claims, 9 Drawing Sheets

DIGITAL RETURNS

BACKGROUND

Retailers customarily offer product return services to their customers when products fail to meet customer expectations. When the item is a tangible item, the customer typically returns the product to the retailer in person or by mail. The retailer may inspect the product and then, if warranted, issue a refund, exchange, or another type of restitution.

Digital content may be transmitted over a network connection from a retailer (or other provider of the digital content) to the customer. The customer may consume the digital content during transmission of the digital content (e.g., play streaming content) or may consume the digital content after transmission of the content (e.g., play downloaded content after completion of a download). In some instances, the transmission, quality of the digital content, or other factors related to the digital content or transmission thereof may be deemed unsatisfactory by the customer.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
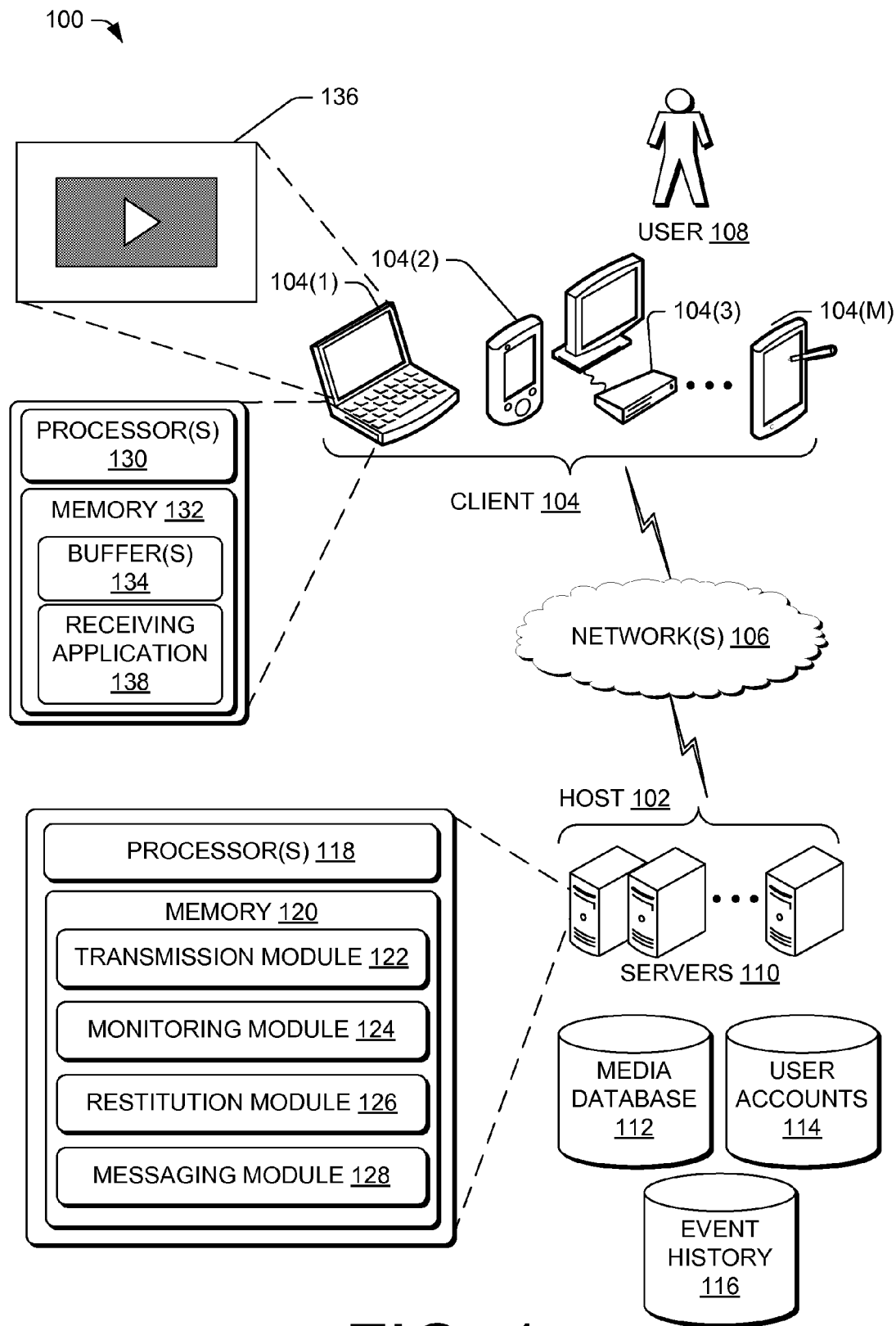
FIG. 1 is a schematic diagram of an illustrative computing environment to monitor a transmission of digital content and, when appropriate, provide restitution to a recipient of the content.

When a user receives digital content, such as streaming media, the user typically desires to receive a certain quality of the digital content with few or no interruptions in the transmission of the digital content. However, many factors, including bandwidth of a network connection between a host and a client, may make it difficult to provide the user with both the desired quality of the digital content and uninterrupted transmission of the digital content.

In some instances, the quality of the digital content may be reduced, thereby reducing an amount of data transmitted to the client. The quality may be measured by a bit rate or other measurable attributes of the digital content. During transmission of the digital content, the host may identify that a throughput of digital content from the host to the client is reduced, the host may begin to transmit a lower quality of the digital content to prevent an interruption during playback of the content at the client device. When variable bit rate (VBR) transmission of digital content is employed by the host, the host may vary the quality of the digital content by switching files that are transmitted to the client. When adaptive bit rate (ABR) transmission of digital content is employed by the host, the quality of the digital content may be reduced or increased dynamically without switching files.

In various instances the quality of rendering of the digital content may vary based at least in part on processing by the client device. The quality of rendering may be measured or observed by a change in a frame rate of the rendered digital content, which can be communicated from the client to the host.

Regardless of whether the quality is reduced, sometimes the client may experience a buffer overrun where the playback of the content is paused when a buffer fill is exhausted. In such an instance, playback may not resume until the buffer has been at least partially replenished with digital content from the host. As discussed herein, the terms "rebuffer," "buffer underrun," and "buffer underflow" may be used interchangeably. These terms each describe an event where a buffer is exhausted during streaming, based on the buffer being emptied faster than a replenish rate of data transmitted to fill the buffer, which results in a pause of playback of the digital content by the client. This event is typically followed by a replenishing of the buffer and resuming of the playback of the digital content when a predetermined amount of the buffer is filled with the digital content. In some instances, one or more rebuffers may trigger the host to reduce a quality of the digital content in order to attempt to prevent a subsequent rebuffer.

A user that experiences one or more rebuffers, a reduction in quality of the digital content or rendering, or a combination thereof, may consider the product or service of transmitting the content to be defective and may expect or desire restitution. As discussed herein, restitution may include a refund of payment, an extension of a license to access the content at later time, a promotion, a coupon, a credit, and/or other types restitution provided by a host (provider of the digital content) to the customer having the client.

The techniques and systems described herein may be implemented in a number of ways. Example implementations are provided below with reference to the following figures.

Illustrative Environment

FIG. 1 is a schematic diagram of an illustrative computing environment 100 to monitor a transmission of digital content and, when appropriate, provide restitution to a recipient of the content. In the environment 100, a host 102 may be in communication with a client 104 via a network 106. In some embodiments, the host 102 may transmit streaming media to the client 104 for playback to a user 108. The host 102 may also transmit digital content to the client 104 as a download, which may be played by the user 108 at a later point in time following a completion of the download.

In accordance with one or more embodiments, the host 102 may include one or more servers 110, perhaps arranged in a cluster or as a server farm. The host 102 may be a web server or another type of information server. Other server architectures may also be used to support the host 102. The host 102 is capable of handling requests from many users and serving, in response, various streams and/or downloads of digital content that can be rendered at the client 104. In some embodiments, the host 102 is a web server that supports user interaction, including online retailers, entertainment sites, audio and/or video distribution sites, informational sites, social networking sites, blog sites, news and entertainment sites, and so forth.

In various embodiments, the host 102 represents a web server that hosts a media database 112. The media database 112 may store a collection of media which may be transmitted from the host 102 to the client 104 via the network 106 for playback to the user 108. The term "digital content", "media" and "digital media" may be used interchangeably and include any video and/or audio which may be streamed to the user 108, such as movies, television shows, previews, personal video recordings, music, news, or any other type of video and/or audio which may be streamed over the network 106 from the host 102 to the client 104.

The host 102 may also include data storage for user accounts 114 and event history 116. The user accounts 114 may store information of the various users (e.g., the user 108), such as payment information, transaction history, restitution history, configuration history, and other information specific to each user. The event history 116 may include a record of transmissions of media from the host 102 to clients, such as the client 104. The event history 116 may record and store data related to transmission of the digital content, quality of the digital content, and/or quality of the rendering of the digital content, collectively "user experience". As discussed above, these qualities may include a measurement of a bit rate, frames/second, or other measurements performed at various times during the transmission. In addition, the event history 116 may record and store data related to rebuffers, time of transmission (e.g., total download time, etc.), and other relevant metrics associated with the transmission and playback of the digital content from the host 102 to a client, such as the client 104.

As illustrated, the host 102 may be equipped with one or more processor(s) 118 and memory 120. The memory 120 may include applications, modules, and/or data. In some embodiments, the memory 120 may include one or more of a transmission module 122, a monitoring module 124, a restitution module 126, and a messaging module 128. In accordance with one or more embodiments, one or more of the monitoring module 124 and a messaging module 128 may be implemented on the client 104. Each module is discussed in turn.

The transmission module 122 may transmit the digital content stored in the media database 112 to the client 104 associated with the user 108. The transmission module 122 may provide streaming media and/or downloads the client 104 over the network 106. In some instances, a download of the digital content may be capable of playback prior to a completion of the download. In various embodiments, the transmission module 122 may include one or more media renderers that enable rendering of digital content via the client 104, such as by rendering the media using a browser or other playback application of the client. The transmission module 122 may manage and/or monitor one or more buffers used to store content of the media database 112 prior to playback of the content.

The monitoring module 124 may monitor actions of the transmission module 122 and record the actions as metrics in the event history 116. For example, the monitoring module 124 may monitor and store data pertaining to a quality of a transmission of the digital content, a quality of rendering of the digital content, and/or a quality of the digital content, such as bit rate, frames per second, download time, rebuffers, and/or other data pertaining to the digital content or transmission thereof.

The restitution module 126 may analyze the event history 116 to determine whether to provide restitution to a user, such as via the user accounts 114. For example, the restitution module may provide one or more of a refund of payment, an extension of a license to access the content at later time, a promotion, a coupon, a credit, and/or other types of restitution provided by the host 102 (provider of the digital content) to the user 108 having the client 104. In some embodiments, the metrics in the event history 116 may be compared to one or more thresholds, which may initiate restitution in response to a request from the user (i.e., reactive) or without a request from the user (i.e., proactive, automatically). For example, if the bit rate or the frames/second falls below a threshold value for a duration or percentage of time exceeding another threshold value, then the restitution module may allow restitution (potentially pending a request from the user). Other thresholds may relate to download time, quantity of rebuffers, or other metrics stored in the event history 116.

The messaging module 128 may provide messaging to the user via the client 104 before or following restitution as determined by the restitution module 126. For example, when the restitution module 126 determines that restitution is warranted based on the event history 116, then the messaging module 128 may communicate the restitution or option for restitution to the user 108. In some embodiments, the messaging module 128 may provide messaging immediately following an event that triggers the restitution. example, if a threshold value for rebuffers is set at three occurrences, then the messaging module 128 may transmit a message from the host 102 to the client 104 following the third rebuffer to indicate to the user 108 that restitution is available to the user 108.

As discussed above, the client 104 may receive digital content from the host 102. The client may include a computer 104(1), a mobile telephone 104(2), a set top box 104(3) (e.g., smart phone, etc.), a tablet 104(M), or other devices capable of receiving the digital content as a stream or download from the host 102 and displaying and/or rendering the digital content for consumption by the user 108.

As illustrated, the client 104 is equipped with one or more processors 130 and memory 132 to store data and applications and to process data. The memory 132 may include one or more buffers 134 to store data, such as a stream or download of digital content 136 received from the host 102. According to some embodiments, a receiving application 138 is stored in the memory 132 and executes on the processor 130 to render or display the digital content 136 from the host 102. The receiving application 138 may render the digital content 136 served by the host 102 on an associated display of the client 104. For example, the receiving application 138 may be a browser configured with a media streaming plug-in which is capable of processing and playing the digital content 136. In some embodiments, the receiving application 136 may include all or a portion of the monitoring module 124 and/or the messaging module 128.

Illustrative Operation

Figure 2:
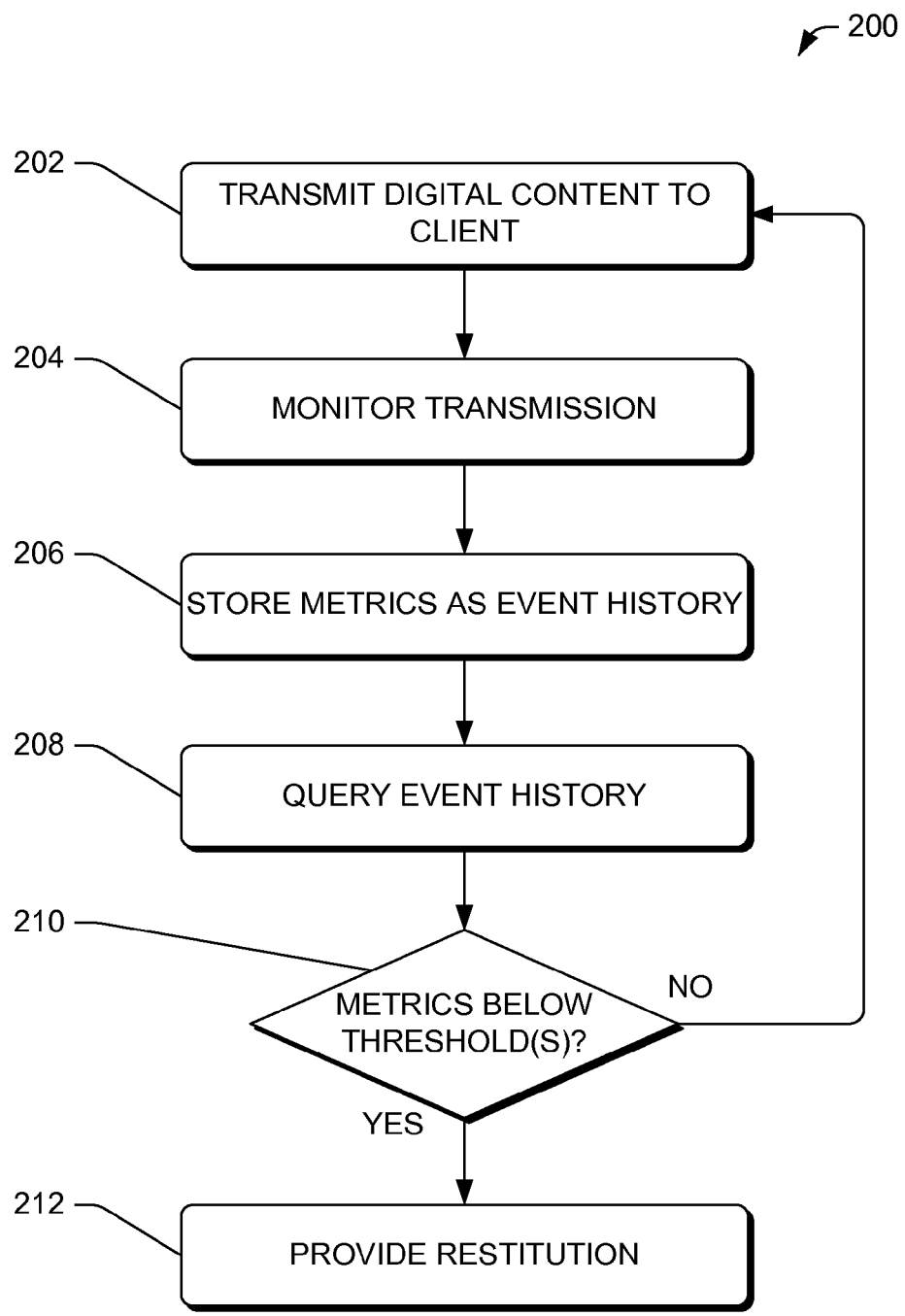
FIG. 2 is a flow diagram of an illustrative process to monitor a transmission of digital content and initiate restitution when a quality of the transmission drops below a threshold.

FIG. 2 is a flow diagram of an illustrative process 200 to monitor a transmission of digital content and initiate restitution when a quality of the transmission drops below a threshold. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

At 202, the transmission module 122 may transmit digital content from the host 102 to the client 104. The transmission module 122 may provide the digital content via a stream of media or as a download of data, which may be played back to the user 108 via the client device 104 during or after receipt of the download.

At 204, the monitoring module 124 may monitor the transmission of the data from the transmission module 122 at the operation 202. The monitoring module 124 may record and/or determine metrics associated with the quality and transmission of the digital content from the host 102 to the client 104.

At 206, the monitoring module 124 may store metrics associated with the quality and transmission of the digital content as the event history 116. For example, the monitoring module 124 may store a bit rate, frames/second, start/end of transmission, or other metrics during periodic or random intervals during the transmission of the digital content. In some instances, the monitoring module 124 may identify and record a rebuffer event when the client exhausts the buffer and the client 104 pauses playback of the digital media.

At 208, the restitution module 128 may query the event history 116. The restitution module 128 may perform the query concurrently with the transmission of the digital media and/or after transmission of the digital media. In some embodiments, the restitution module 128 may query the event history 116 in response to a user request for restitution. In this way, the restitution module 128 may be used to verify facts or events surrounding a request for restitution.

At 210, the restitution module 128 may determine whether the metrics associated with a transmission of digital content fail to comply with one or more thresholds. The thresholds may be based at least in part on user selected settings that establish the transmission of the digital content. For example, when the event history 116 shows that a bit rate or frames/second value associated with the digital content falls below a threshold value, then the restitution module 126 may approve restitution at 212 (via "yes" route). In some instances, when the query is performed concurrent with the transmission of the digital content at the operation 208, then the transmission may continue to be performed following a decision of "no" at the decision operation 210.

At 212, the restitution module may provide restitution. The restitution may include, without limitation, a refund of payment, an extension of a license to access the content at later time, a promotion, a coupon, and/or a credit to a user account stored in the user accounts 114.

Figure 3A:
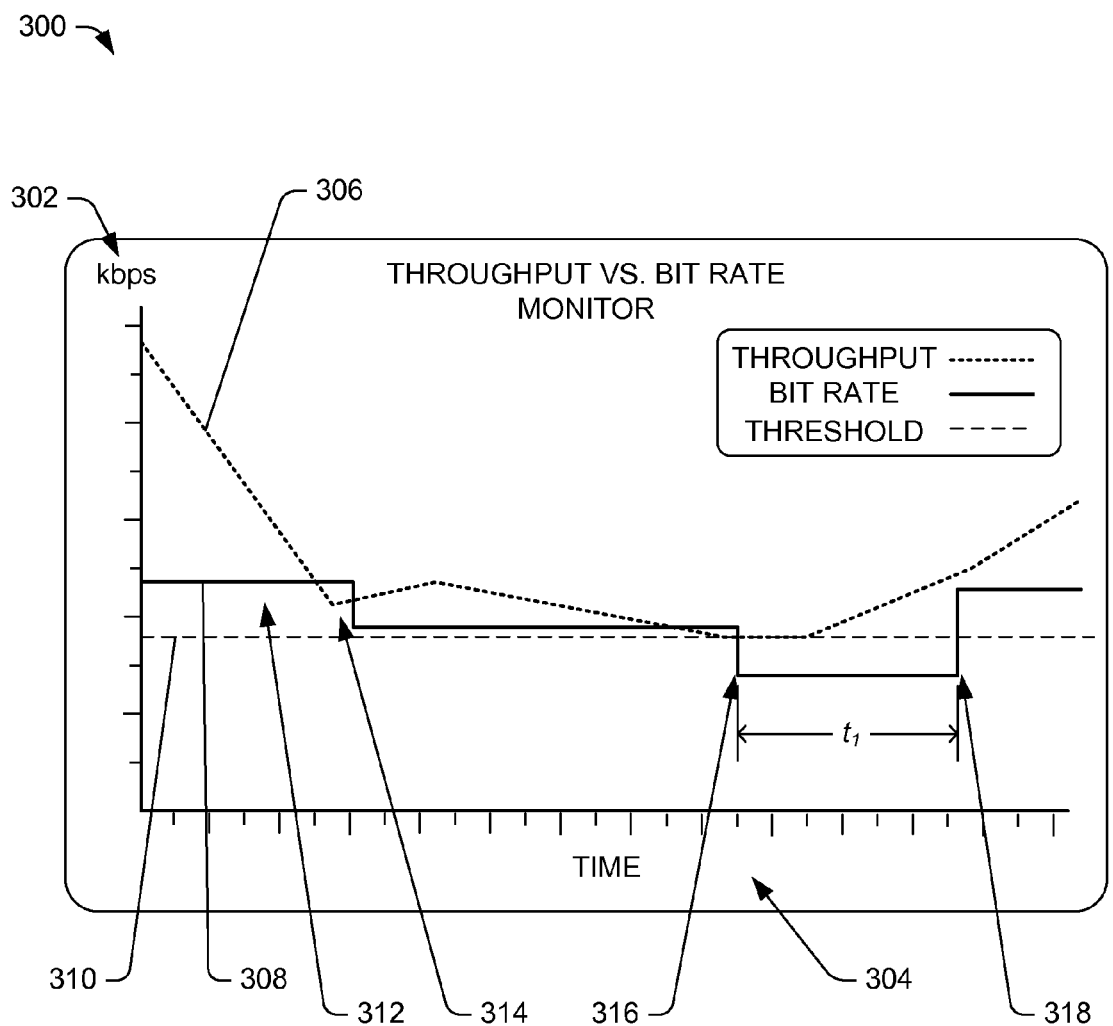
FIGS. 3a, 3b, and 3c are schematic diagrams showing illustrative metrics associated with transmission and rendering of digital content.
Figure 3B:
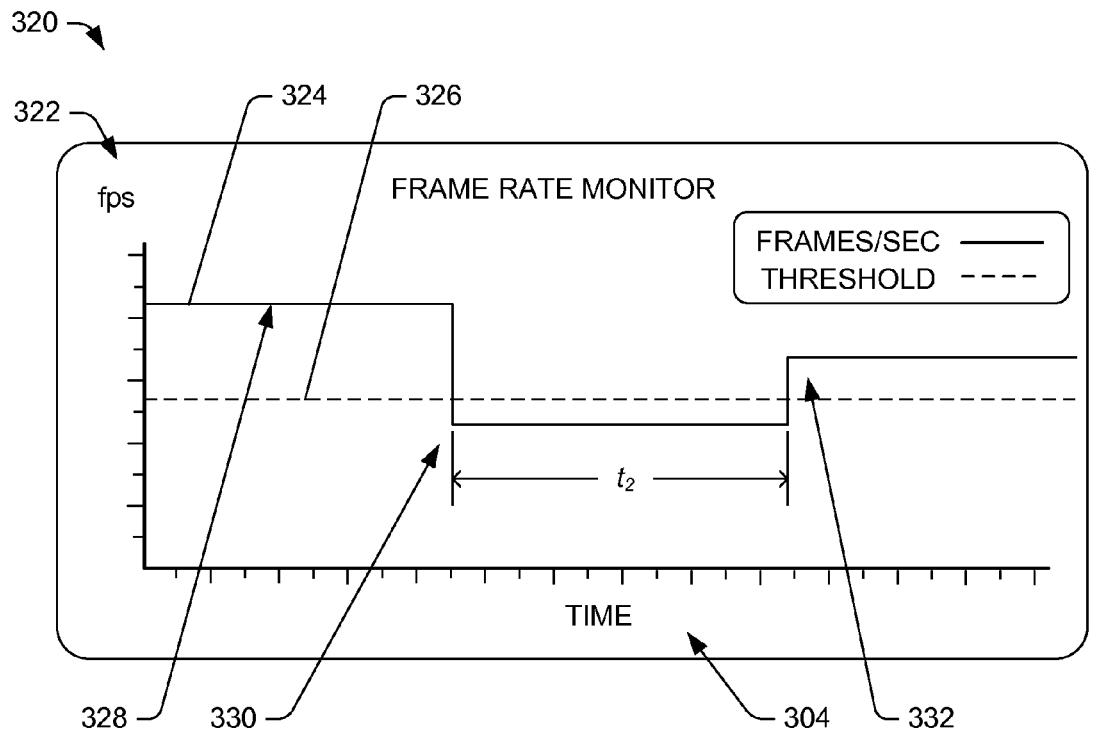
Figure 3C:
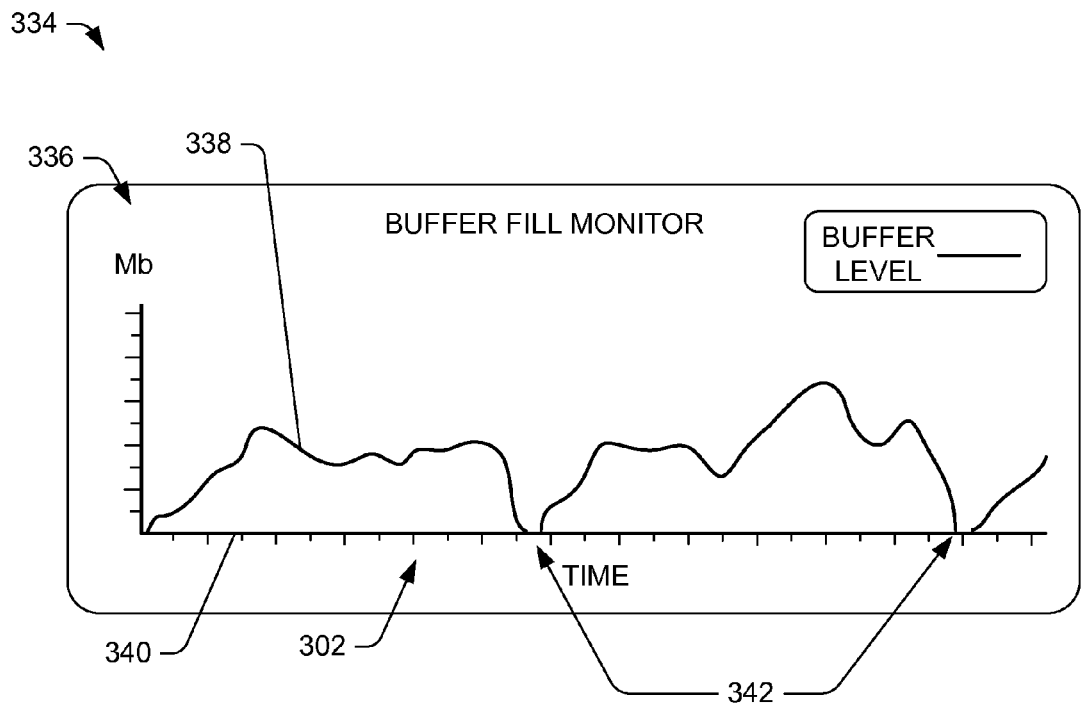

FIGS. 3a, 3b, and 3c are schematic diagrams showing illustrative metrics associated with transmission and rendering of digital content. Each of the diagrams illustrate a non-exhaustive series of various instances which may result in restitution in accordance with the process 200 described above.

FIG. 3a is a schematic diagram of an illustrative throughput versus bit rate monitor 300. The monitor 300 shows kilobytes per second (kbps) 302 with respect to time 304. The monitor 300 plots illustrative data for throughput 306 and bit rate 308 with respect to a threshold 310. The throughput may be influenced by limitations of network connectivity and/or a rate of transmission of data by the host 102.

As shown by the illustrative data, a first segment 312 of the data may include a throughput that is greater than a bit rate of digital media transmitted to a client. However, over time the throughput may fall below the bit rate at a second segment 314, which may result in the host to initiate transmission of lower quality digital content (e.g., swapping files and/or lowering bit rate, etc.). Continuing along data, the through put may again fall below the adjusted bit rate value at a third segment 316, which may result in transmission of even lower quality digital content by the host. The throughput may subsequently improve at a fourth segment 318 to enable transmission of a higher quality of digital content by the host, such as the quality requested by the user of a client device. As shown in the monitor 300, the bit rate value, which may be an average bit rate or other representative value for the digital content, may fall below the threshold 310 for a length of time $t_1$. This data may be stored as event history at the operation 206 and used to determine whether restitution is applied at the operations 210 and 212 in the process 200.

FIG. 3b is a schematic diagram of an illustrative frame rate monitor 320. The monitor 300 shows frames per second (fps) 322 with respect to time 304. The monitor 320 plots illustrative data for frames/second 324 with respect to a threshold 326. The frame rate may be influenced or determined by the rate at which the digital media is rendered by the client 104. The client 104 may transmit this information to the host 102 for comparison to the threshold. As shown by the illustrative data, a first segment 328 may include rendering of the digital media at a first frame rate. At a second segment 330, the client 104 may render the digital content at a lower frame rate, which may be less than the threshold 326, for a length of time $t_2$. At a third segment 332, the frame rate may return to level above the threshold 326. Again, this data may be stored as event history at the operation 206 and used to determine whether restitution is applied at the operations 210 and 212 in the process 200.

FIG. 3c is a schematic diagram of an illustrative buffer fill monitor 334. The monitor 334 shows megabytes (Mb) with respect to time 304. The monitor 334 plots illustrative data for a buffer level 338 with respect to a threshold 340, which may be a buffer fill of 0 Mb. The buffer level 338 may be influenced or determined by the throughput and/or bit rate as shown in the monitor 300 of FIG. 3a. The client 104 may transmit this information to the host 102 for comparison to the threshold. As shown by the illustrative data, the buffer level 338 may drop to 0 Mb at various instances 342, which results in a buffer overrun and pause in a playback of the digital content by the client 104. Again, this data may be stored as event history at the operation 206 and used to determine whether restitution is applied at the operations 210 and 212 in the process 200.

Although the illustrative metrics 300 shown in the chart only depict the bit rate, frames/second, and buffer fill data, the metrics may include other data that is relevant to the quality of the digital content, the quality of rendering the digital content, and/or the quality of the transmission of the digital content.

Figure 4:
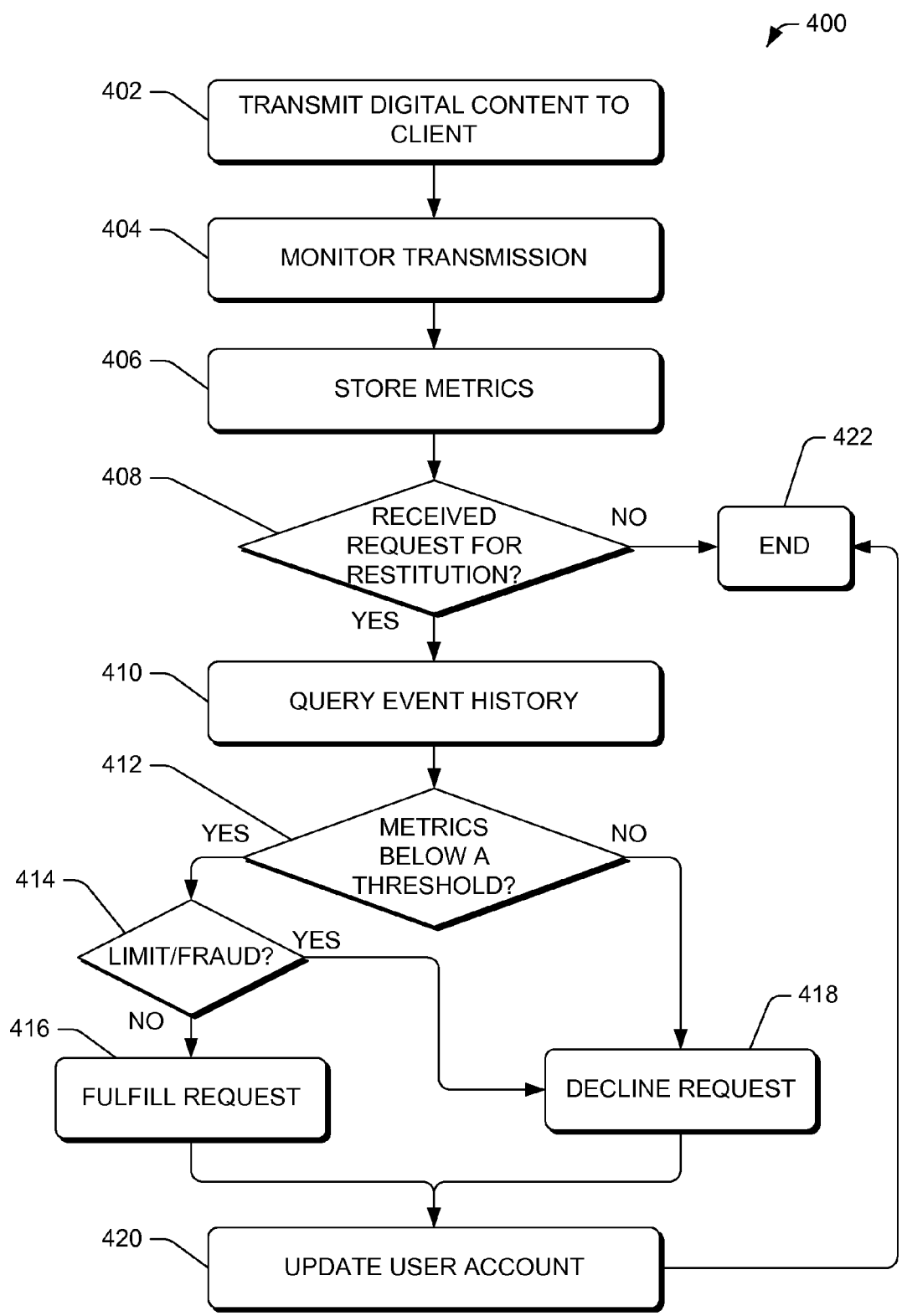
FIG. 4 is a flow diagram of an illustrative process to respond to a request for restitution from a user.

FIG. 4 is a flow diagram of an illustrative process 400 to respond to a request for restitution from a user. The request may follow an experienced reduction in quality of the digital content, a reduced quality of rendering of the digital content, or an interruption of the transmission of the digital content.

At 402, the transmission module 122 may transmit digital content from the host 102 to the client 104 for consumption by the user 108. The transmission may be a streaming of the digital media and/or a download of the digital media for replay during or after the download. The monitoring module 124 may monitor the transmission at 404 and store metrics from the monitoring at 406, which may be stored in the event history 116.

At 408, the restitution module 126 may determine whether the user 108 has requested restitution. For example, the user 108 may request restitution by contacting the host 102, or a representative of the host, to seek restitution. In some embodiments, the host 102 may ask the user 108 whether the user desires restitution, such as after the host 102 identifies a reduced quality of the digital media, reduced quality of rendering, and/or reduced quality of transmission of the digital media to the user.

When the restitution module 126 determines that the user 108 requests restitution at 408, the restitution module may query the event history at 410 to determine facts regarding the quality of the digital content, rendering, and/or transmission of the digital content. In some embodiments, the restitution module 126 may compare the event history 116 with threshold values, which may include or be influenced by user selected settings that establish the transmission of the digital content. The user-selected settings may include a selected bit rate, a frames/second value, a type of quality (e.g., high definition (HD), standard definition (SD), etc.) and so forth.

At 412, the restitution module 126 may determine whether the metrics fail to comply with one or more thresholds based at least in part on the query of the event history at the operation 410. When the metrics are determined to fail to comply with the thresholds (e.g., fall below or exceed some thresholds, when applicable), the restitution module 126 may determine whether a limit and/or fraud has occurred at 414. For example, in some instances, a user may not be able to seek a refund or exchange on digital content that was free of charge, for more than a predetermined number of occurrences, or for other reasons. In addition, some activity may be determined to be fraudulent, and thus disqualify a user from receiving restitution. Finally, when the request limit is not met ("no" route), then the restitution module 126 may fulfill the request at 416 and update the user account at 420 to reflect the restitution.

When limit/fraud is triggered at 414 or the metrics do not comply with a threshold limit at 412, then the restitution module 126 may decline the request at 418 or take other appropriate action, such as initiate further communication with the client 104. The process 400 may end at 422 following an update to the user account at the operation 420, a lack of a request for restitution at the decision operation 408, including an expiration of a time for request, or for other reasons.

Figure 5:
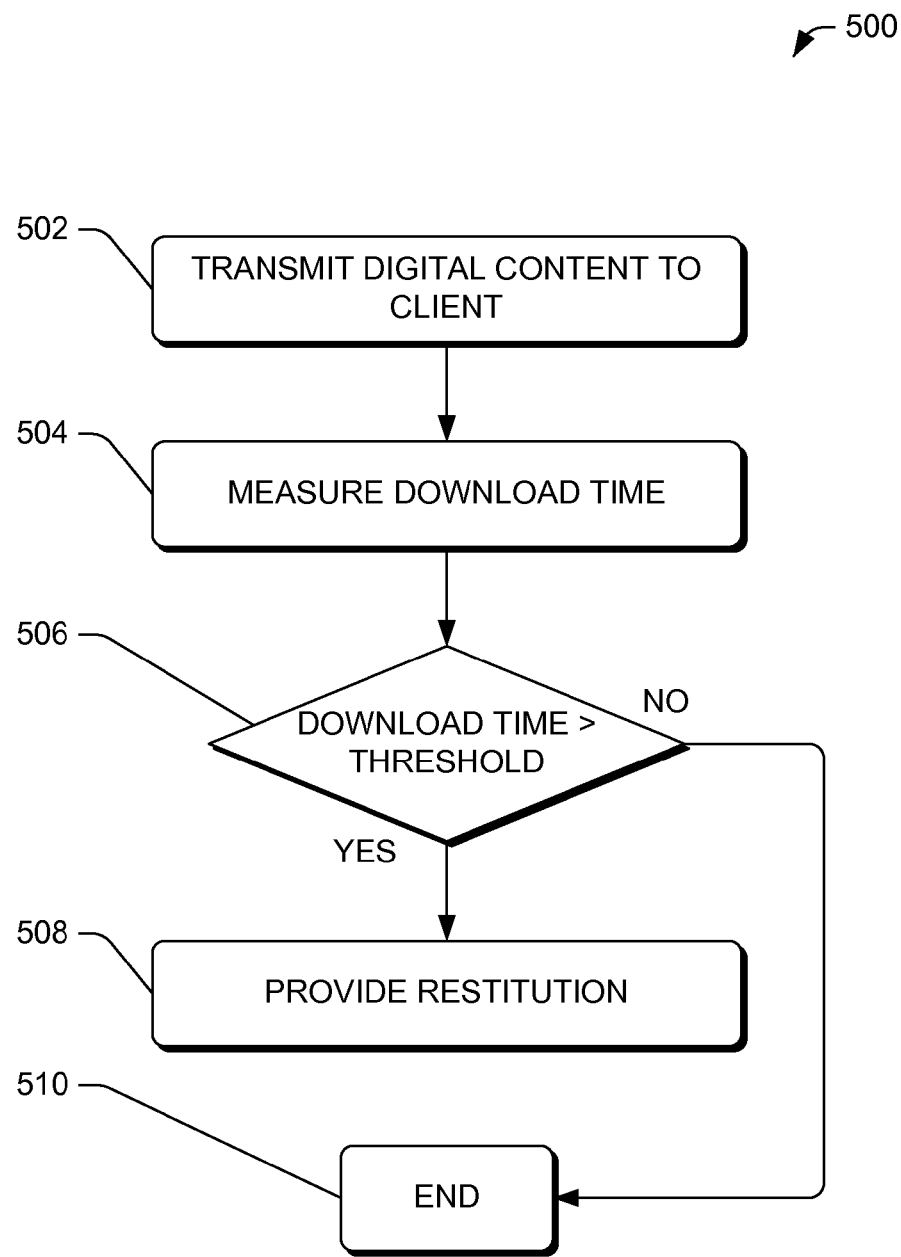
FIG. 5 is a flow diagram of an illustrative process to measure an amount of time needed to download digital content where the process may provide restitution when the time surpasses a threshold.

FIG. 5 is a flow diagram of an illustrative process 500 to measure an amount of time needed to download digital content where the process may provide restitution when the time surpasses a threshold. At 502, the transmission module 122 may download the digital media from the host 102 to the client 104.

At 504, the monitoring module 124 may determine a length of time for the download to complete. The monitoring module 124 may, for example, store a start time and end time of the download, which may be used to determine a total download time.

At 506, the restitution module 126 may determine whether the download time is greater than a threshold value. The threshold value may be based at least in part on an estimated download time. For example, the threshold value may be equal to the estimated download time or a multiple of the estimated download time (1.5×, 2×, 3×, etc., where 2× is twice as long as the estimated download time).

The restitution module 126 may provide restitution at 508 when the download time exceeds the threshold time determined at the decision operation 506 ("yes" route). When the download time does not exceed the threshold at the decision operation 506 ("no" route), the process 500 may end at 510.

Figure 6:
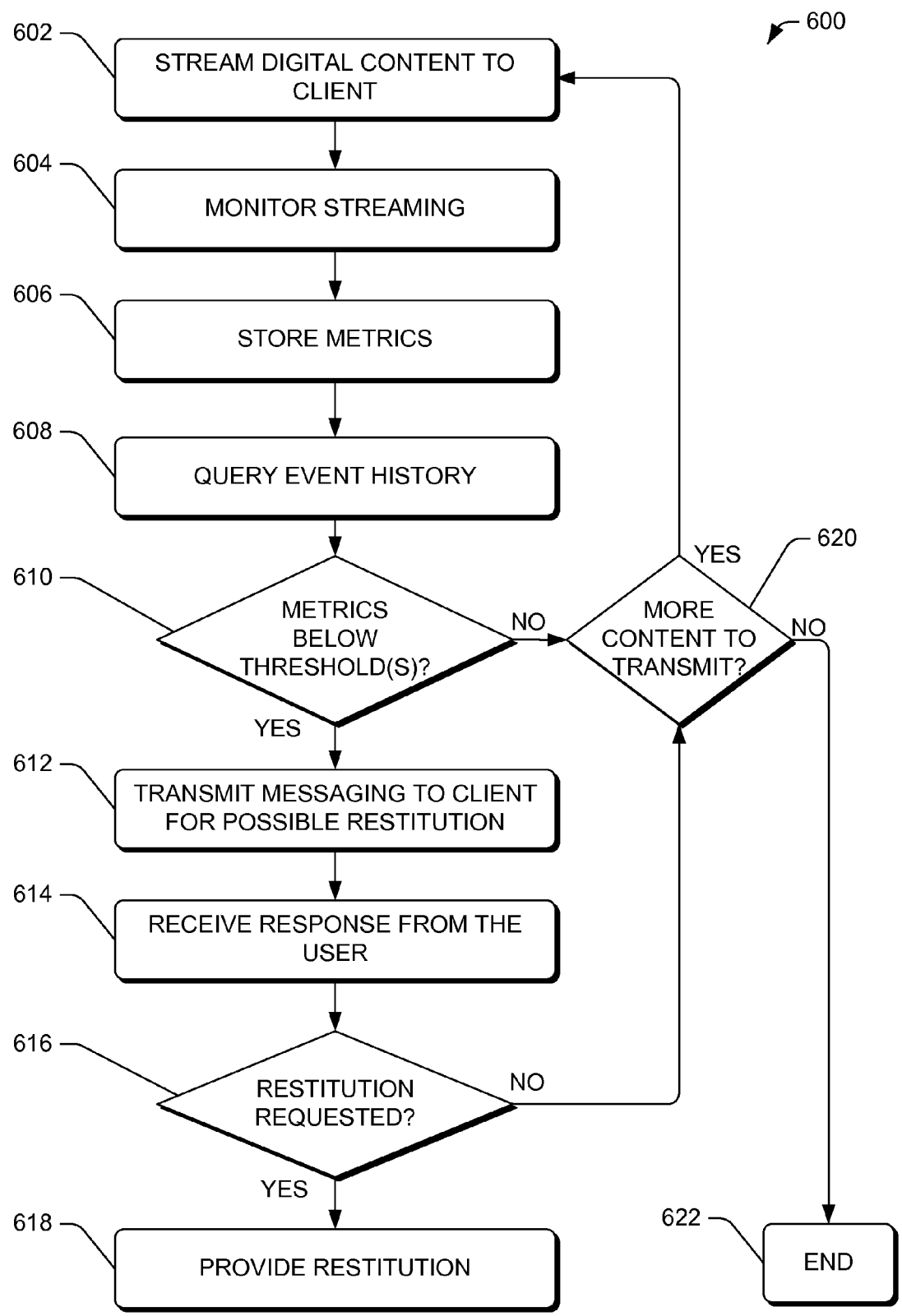
FIG. 6 is a flow diagram of an illustrative process to provide messaging to a user that may have experienced a low quality of digital content or transmission thereof.

FIG. 6 is a flow diagram of an illustrative process 600 to provide messaging to a user that may have experienced a low quality of digital content or transmission thereof.

At 602, the transmission module 122 may stream the digital content from the host 102 to the client 104 for consumption by the user 108. The monitoring module 124 may monitor the streaming of the digital media at 604 and store metrics related to the monitoring at 606 as the event history 116. At 608, the restitution module may query the event history.

The restitution module 126 may query the event history continually, periodically, or randomly during the streaming of the digital media. Thus, the operation 608 may occur concurrently with the streaming of the media at the operation 602. At 610, the restitution module 126 may determine whether the metrics fail to comply with one or more threshold values.

When the metrics fail to comply with the threshold value(s) at the decision operation 610, then the messaging module 128 may transmit messaging to the client 104 for the user 108 to indicate possible restitution to the user. In some embodiments, the messaging module 128 may transmit the messaging immediately following an event that triggers the restitution decision at the decision operation 610. For example, the messaging module 128 may transmit a message to the client 104 during a pause in the stream of media to the client, such as when the host 102 is replenishing the buffer during a rebuffer event. The messaging module 128 may also transmit the message via other techniques, such as an email, a notice via the user accounts 112, a telephone call, a text message, or via other techniques.

In some embodiments, the message may inform the user 108 that the user will receive restitution. However, in various embodiments, the user 108 may opt-in for restitution, and may then either be able to continue to receive the digital media or may be prevented from receiving the digital media. For example, the user may be permitted to continue to receive the digital media when the transmission of the digital content is substantially complete (e.g., almost at an end of a movie, etc.). At 614, the message module 128 may receive an election from the user as to whether to opt-in and receive restitution or to opt-out.

At 616, the restitution module 126 may determine whether the user has requested restitution from the response received at the operation 614. When the restitution module 126 determines that the user has requested restitution at the decision operation at 616 ("yes" route), then the restitution module 126 may provide the restitution at 618, such as by modifying data in the user accounts 112 or taking other appropriate actions.

Returning to the decision operation at 610, when the metrics do not comply with the threshold value(s), then the transmission module 122 may determine whether additional content remains to be streamed to the client 104, and thus continues streaming at 602 ("yes" route) or ends the streaming at 622 ("no" route).

Figure 7:
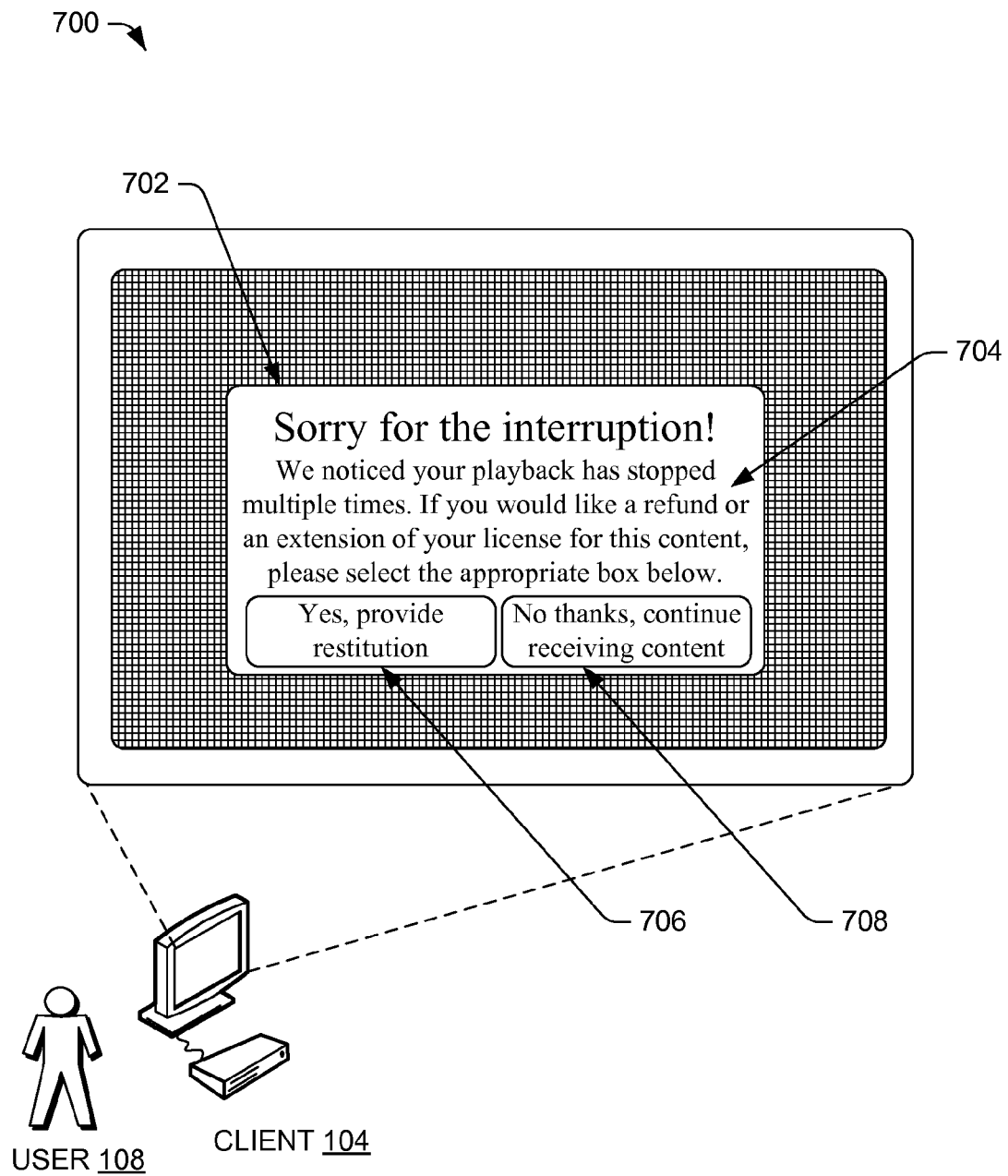
FIG. 7 is an illustrative user interface (UI) to allow a user to selective restitution during a streaming of digital content.

FIG. 7 is an illustrative user interface (UI) 700 to allow a user to selective restitution during a streaming of digital content. The UI 700 may be rendered by the client 104 for display to the user 108. The UI 700 may include a message 702 that is generated by the messaging module 128 during the process 600 shown in FIG. 6.

The message 702 may include a message body 704 to inform the user 108 of the possible restitution. For example, the message may indicate a problem, such as a quantity of rebuffers (play has stopped multiple times, etc.) or other reasons (e.g., reduced quality, pause in a download, etc.). The message 702 may include a first option 706 that, when selected by the user, provides restitution to the user. In some embodiments, the user may be presented with options for restitution, such as a refund, a promotion, a future discount, an extended license to view the digital content, and so forth. Following a selection of the first option, the transmission module 122 may either terminate transmission of the digital media, delay transmission until a later time (potentially starting over), or may resume at the current location based on various circumstances, (e.g., amount of digital content left to be played, etc.).

The message 702 may include a second option 708 that, when selected by the user, rejects the offer for restitution. In some embodiments, following the selection of the second options, the transmission module 122 may subsequently resume transmission of the digital media to the client 104.

Figure 8:
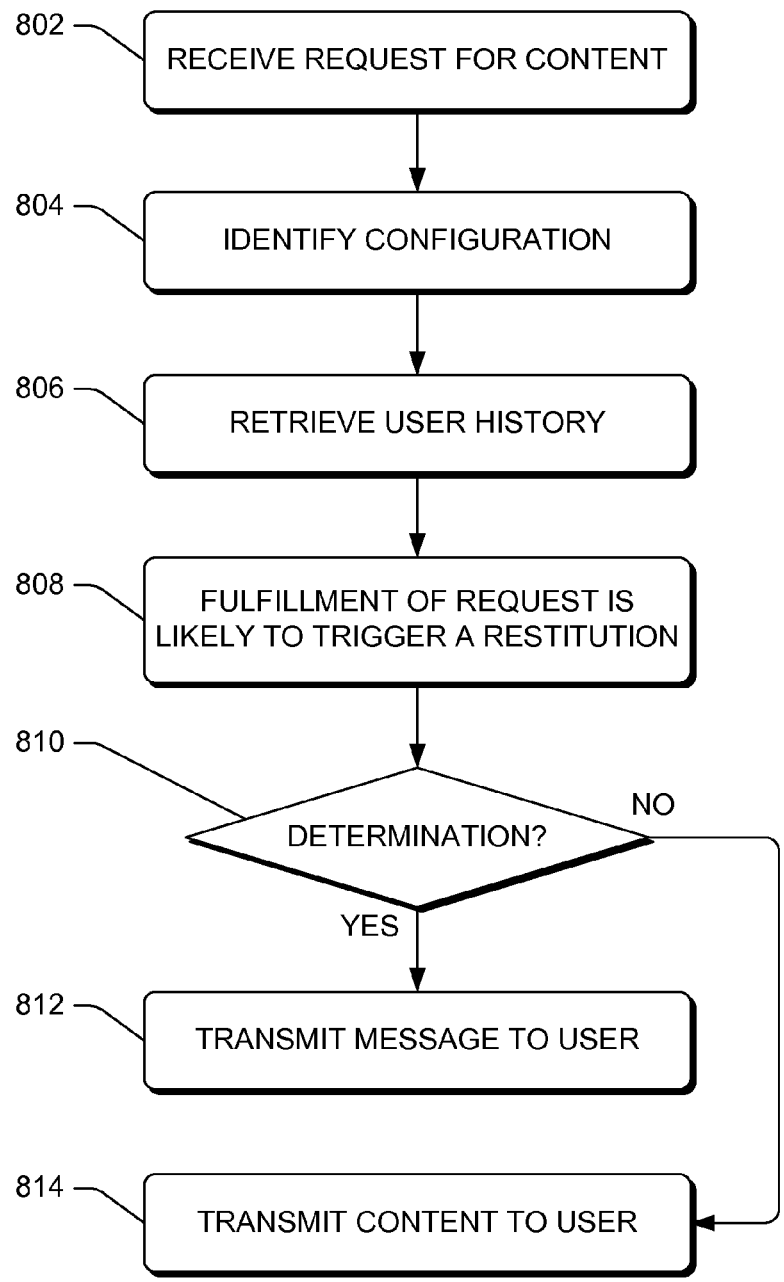
FIG. 8 is a flow diagram of an illustrative process to evaluate a request for digital media from a user and provide messaging or fulfillment in response to the request.

FIG. 8 is a flow diagram of an illustrative process 800 to evaluate a request for digital media from a user and provide messaging or fulfillment in response to the request. The process 800 may be used to prevent a possible reduction in quality of the digital content, rendering, and/or possible problems with transmission of the digital content from the host 102 to the client 104.

At 802, the transmission module 122 may receive a request for digital content from the user 108. The request may include information that identifies the user 108, such as user credentials to enable access of to one of the user accounts 114. The request may also include a selection by the user 108 of settings for the digital content, such as a bit rate, frames/second, type of definition (HD, SD, etc.), and so forth).

At 802, the transmission module 122 may identify a configuration that is used to transmit the digital content and perform the playback. The configuration may include information about hardware and/or software available on the client 104 that is to receive the digital content. Further, the configuration information may include information about the network 106 used during the transmission of the digital content. The transmission module 1222 may perform an analysis to identify past performance of the network for the user or other users that share the network (e.g., same Internet service provider (ISP), Internet protocol (IP) address, etc.). In some embodiments, the operation 804 may include an exchange of data between the host 102 and the client 104, such as to test performance of the network and/or the client 104, and so forth.

At 806, the transmission module 122 may retrieve user history from the user accounts 114. The user history may enable a determination of appropriate settings (bit rate, frames/second, etc.) for the user based on the information received at the operations 802 and 804.

At 808, the transmission module 122 may analyze the request in light of the identified configuration and user history to determine whether the fulfillment of the request from the operation 802 is likely to trigger interruptions in the transmission of the digital content and/or a reduction in quality of the digital content, and therefore, possible restitution. At 810, the transmission module 122 may perform the determination.

When the determination at 810 indicates that a restitution event is likely, then the messaging module 128 may provide messaging to the client 104 at 812 ("yes" route) to indicate possible changes to the request (e.g., change to transmission settings, etc.) or other appropriate messaging. When the determination at 810 indicates that a restitution event not likely, then the transmission module 122 may initiate transmission of the digital content to the client 104 at 812 ("no" route).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more computer systems configured with specific computer-executable instructions:
receiving, at a content provider from a client device associated with a user, a request to receive a digital content item in return for a payment;
determining a performance of a network associated with the client device;
generating testing results based at least partly on the performance of the network;
determining, based at least partly on the testing results, that request attributes received from the client device are not likely to cause a reduction in a first quality of an output of the digital content item;
streaming the digital content item from the content provider to the client device at a second quality that varies based at least in part on at least one of network bandwidth or a buffer fill level of the client device;
monitoring, at the content provider, the streaming of the digital content item from a start of the streaming of the digital content item to an end of the streaming of the digital content item;
storing, at the content provider, metrics associated with the second quality of the streaming of the digital content item during the streaming of the digital content item;
comparing, at the content provider, the metrics with one or more threshold values that are associated with an encoding bit rate of the digital content item; and
providing restitution to the user based at least partly on a determination that the metrics indicate that the second quality of the streaming of the digital content item fails to achieve at least one threshold value of the one or more threshold values, wherein the restitution comprises at least one of an extension of a term to receive the digital content item or a refund of at least a portion of the payment from the user for the digital content item.

2. The method as recited in claim 1, wherein the request is a first request, and the providing the restitution to the user occurs without receiving a second request from the client device.

3. The method as recited in claim 1, wherein the comparing is further based at least in part on a quantity of one or more rebuffer events that occur at a time at which a buffer of the client device is exhausted during the streaming of the digital content item.

4. The method as recited in claim 1, wherein the comparing includes determining a length of time that the encoding bit rate is below a respective threshold value.

5. A method comprising:
under control of one or more computer systems configured with executable instructions:
receiving a request for digital content from a client device associated with a user, wherein the request includes request attributes associated with transmission of a digital content item;
determining a performance of a network associated with the client device;
generating testing results based at least on the performance of the network;
determining, based at least partly on the testing results, that the request attributes received from the client device are not likely to cause a reduction in a first quality of an output of the digital content item;
streaming the digital content item to the client device associated with the user;
monitoring parameters indicative of a user experience associated with the streaming of the digital content item during the streaming of the digital content item;
determining, by the one or more computer systems, during the streaming of the digital content item and based at least in part on the parameters, whether a second quality of the user experience is less than a threshold value;
presenting a message to the user on a presentation interface associated with the client device offering restitution to the user upon determining that the second quality of the user experience is less than the threshold value;
receiving, via a user input associated with the presentation interface, a user input accepting the restitution; and
initiating the restitution to the user based at least in part on receipt of the user input.

6. The method as recited in claim 5, wherein the user experience associated with the streaming of the digital content item is based at least in part on at least one of a third quality of transmission of the digital content item, a fourth quality of the digital content item, or a fifth quality of rendering of the digital content item.

7. The method as recited in claim 5, wherein
the monitoring the parameters indicative of the user experience comprises determining a number of rebuffer events that occurred on the client device during the streaming of the digital content item;
the threshold value comprises a threshold number of rebuffer events; and
the initiating the restitution occurs at least partly in response to determining that the number of rebuffer events that occurred on the client device is greater than the threshold number of rebuffer events.

8. The method as recited in claim 5, wherein
the monitoring the parameters indicative of the user experience comprises determining an amount or percentage of time a lower quality level of the digital content item is streamed to the client device as compared to a selected quality of the digital content item that is expected to be received by the client device;
the threshold value comprises a threshold amount or percentage of time; and
the initiating the restitution occurs at least partly in response to determining that the streaming of the digital content item occurs at the lower quality level for an amount or percentage of time that is greater than the threshold amount or percentage of time.

9. The method as recited in claim 5, wherein:
the monitoring the parameters indicative of the user experience comprises determining an amount or percentage of time a lower frame rate of the digital content item rendered by the client device as compared to an anticipated frame rate of the digital content item that is expected to be rendered by the client device;
the threshold value comprises a threshold amount or percentage of time; and
the initiating the restitution occurs at least partly in response to determining that rendering of the digital content item occurs at the lower frame rate for an amount or percentage of time that is greater than the threshold amount or percentage of time.

10. The method as recited in claim 1, further comprising determining, at the content provider, whether a fraud has occurred when the metrics indicate that the second quality of the streaming of the digital content item fails to achieve at least one of the one or more threshold values.

11. One or more non-transitory computer-readable storage media storing instructions that when executed by one or more processors, cause the one or more processors to:
receive a request for digital content from a client device associated with a user, wherein the request includes request attributes associated with transmission of a digital content item;
determine a past performance of a network associated with the client device;
determine a hardware configuration of the client device;
determine that the request attributes received from the client device are not likely to cause a reduction in a first quality of an output of the digital content item based at least in part on the past performance of the network and the hardware configuration of the client device;
transmit, in exchange for a payment, the digital content item to the client device associated with the user;
store, at a content provider, metrics associated with transmitting of the digital content item to the client device, the metrics associated with at least one of a second quality of the digital content item, a third quality of the transmitting of the digital content item, or a fourth quality of rendering of the digital content item;
determine that the metrics include at least one instance where the at least one of the second quality of the digital content item, the third quality of the transmitting the digital content item, or the fourth quality of the rendering of the digital content item fails to comply with a threshold value that is based at least in part on at least one of a variable bit rate or an adaptive bit rate transmission of the digital content item; and
determine restitution specific to the digital content item to provide to the user after a determination that the at least one instance fails to comply with the threshold value.

12. The one or more non-transitory computer-readable storage media as recited in claim 11, further comprising instructions that when executed by the one or more processors, cause the one or more processors to receive a request for restitution from the client device, and wherein the determining that the metrics include at least one instance is based at least in part on receipt of the request.

13. The one or more non-transitory computer-readable storage media as recited in claim 11, further comprising instructions that when executed by the one or more processors, cause the one or more processors to transmit a message to the client device to indicate that restitution has been provided to the user.

14. The one or more non-transitory computer-readable storage media as recited in claim 11, wherein the transmitting includes streaming the digital content item to the client device for playback of the digital content item by the client device, and wherein the determining that the metrics include at least one instance occurs concurrently with the streaming of the digital content item.

15. The one or more non-transitory computer-readable storage media as recited in claim 14, further comprising instructions that when executed by the one or more processors, cause the one or more processors to provide a message to the client device, the message indicating that the second quality of the digital content item or the third quality of the transmitting of the digital content item fails to comply with the threshold value and, the message including an option to receive the restitution.

16. The one or more non-transitory computer-readable storage media as recited in claim 11, wherein the third quality of the transmitting of the digital content item is further based at least in part on a total download time for the digital content item compared to an estimated download time for the digital content item.

17. The one or more non-transitory computer-readable storage media as recited in claim 11, wherein the second quality of the digital content item is further based at least in part on a reduction in size of the digital content item.

18. The one or more non-transitory computer-readable storage media as recited in claim 11, wherein the third quality of the transmitting of the digital content item is further based at least in part on a quantity of one or more rebuffer events that occur at a time at which a buffer of the client device is exhausted during the transmitting of the digital content item.

19. The one or more non-transitory computer-readable storage media as recited in claim 11, wherein the fourth quality of the rendering of the digital content item is further based at least in part on a frame rate rendered by the client device.

20. The one or more non-transitory computer-readable storage media as recited in claim 11, wherein the threshold value includes an amount or percentage of time that the second quality of the digital content item or the fourth quality of the rendering of the digital content item is less than a predetermined value.

21. The one or more non-transitory computer-readable storage media as recited in claim 11, wherein the threshold value is based at least in part on a selection by the user of the second quality of the digital content item.

22. One or more non-transitory computer-readable media storing computer-executable instructions that, when executed on one or more processors, cause the one or more processors to:
receive a request for digital content from a client device associated with a user, wherein the request includes request attributes associated with transmission of the digital content;
determine a past performance of a network associated with the client device;
determine a hardware configuration of the client device;
determine that the request attributes received from the client device are not likely to cause a reduction in a first quality of an output of the digital content based on the past performance of the network and the hardware configuration of the client device;
transmit the digital content to the client device associated with the user;
store performance attribute information associated with the transmission of the digital content, the performance attribute information associated with at least one of the first quality of the output of the digital content or a second quality of the transmission of the digital content;
determine that the performance attribute information includes at least one instance where the at least one of the first quality of the output of the digital content or the second quality of the transmission of the digital content fails to comply with one or more threshold values;
provide a message to the client device, the message indicating that the first quality of the output of the digital content or the second quality of the transmission of the digital content fails to comply with the one or more threshold values and including an option to receive restitution; and
provide the restitution to the user in response to the user exercising the option to receive the restitution.

23. The one or more non-transitory computer-readable media as recited in claim 22, wherein the providing the restitution is performed at least partly in response to receipt of a request for the restitution from the client device.

24. The one or more non-transitory computer-readable media as recited in claim 22, wherein the restitution is an extension of a license to receive or play the digital content.

25. The one or more non-transitory computer-readable media as recited in claim 22, wherein at least one of the first quality of the output of the digital content or the second quality of the transmission of the digital content is based at least in part on a bit rate associated with the digital content.

26. The one or more non-transitory computer-readable media as recited in claim 22, wherein the second quality of the transmission of the digital content is based at least in part on a quantity of one or more rebuffer events that occur at a time at which a buffer of the client device is exhausted during the transmission of the digital content.

27. The one or more non-transitory computer-readable media as recited in claim 22, wherein the message to the client device includes information related to the at least one instance where the first quality of the output of the digital content or the second quality of the transmission of the digital content fails to comply with the one or more threshold values.

* * * * *